United States Patent [19]

Plantholt

[11] Patent Number: 4,800,427
[45] Date of Patent: Jan. 24, 1989

[54] METHOD OF COMPATIBLY INCREASING RESOLUTION IN A COLOR TELEVISION SYSTEM

[75] Inventor: Martin Plantholt, Hemmingen, Fed. Rep. of Germany

[73] Assignee: Deutsche Thomson-Brandt GmbH, Villingen-Schwenningen, Fed. Rep. of Germany

[21] Appl. No.: 127,272

[22] Filed: Nov. 30, 1987

[30] Foreign Application Priority Data

Nov. 29, 1986 [DE] Fed. Rep. of Germany ....... 3640848

[51] Int. Cl.[4] ...................... H04N 7/12; H04N 7/087
[52] U.S. Cl. .............................. 358/141; 358/21 V; 358/138
[58] Field of Search ............... 358/12, 21 V, 138, 141, 358/142

[56] References Cited

U.S. PATENT DOCUMENTS

| | | | |
|---|---|---|---|
| 2,810,780 | 10/1957 | Loughlin | 358/12 |
| 3,334,301 | 8/1967 | Sarkany et al. | 358/141 |
| 3,372,228 | 3/1968 | Law | 358/138 |
| 4,485,395 | 11/1984 | Warren | 358/17 |
| 4,485,401 | 11/1984 | Tan et al. | 358/141 |
| 4,521,803 | 6/1985 | Gittinger | 358/141 |
| 4,621,286 | 11/1986 | Reitmeier et al. | 358/141 |
| 4,626,913 | 12/1986 | Gurumurthy | 358/142 |

Primary Examiner—John W. Shepperd
Attorney, Agent, or Firm—Spencer & Frank

[57] ABSTRACT

Method of compatibly increasing the resolution in a color television system employing offset modulation at the transmitter and offset demodulation at the receiver and transmitting a reference signal during the vertical blanking interval. The reference signal includes two components of which the first component contains phase information regarding the spectral addition at the receiver and the second component contains information regarding the offset modulation phase. Thus offset demodulation is realized at the receiver while retaining compatibility with existing televsion standards.

11 Claims, 2 Drawing Sheets

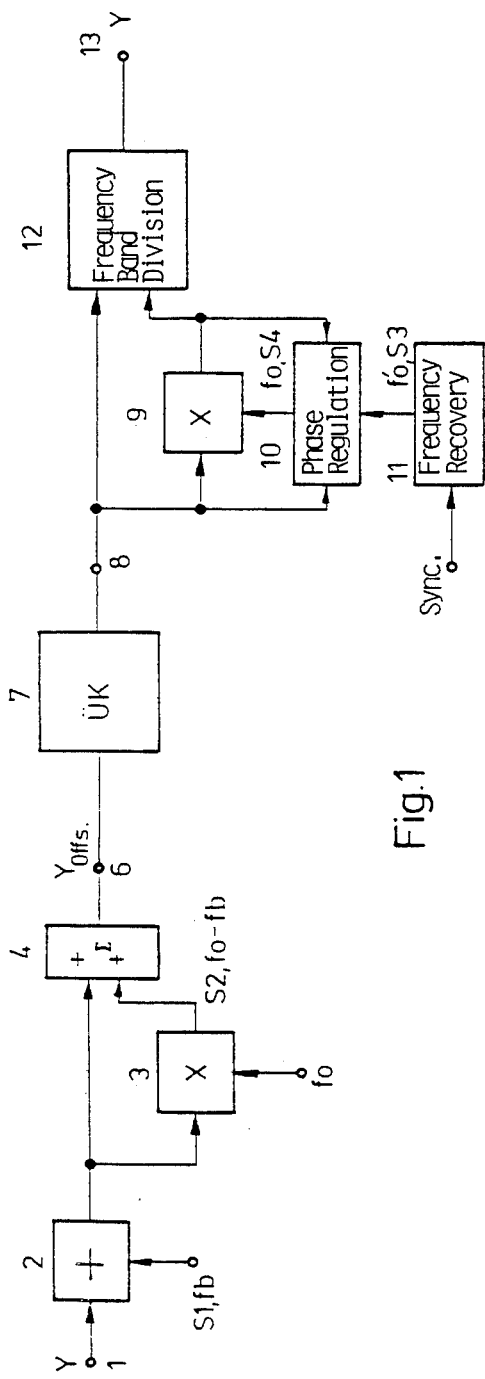
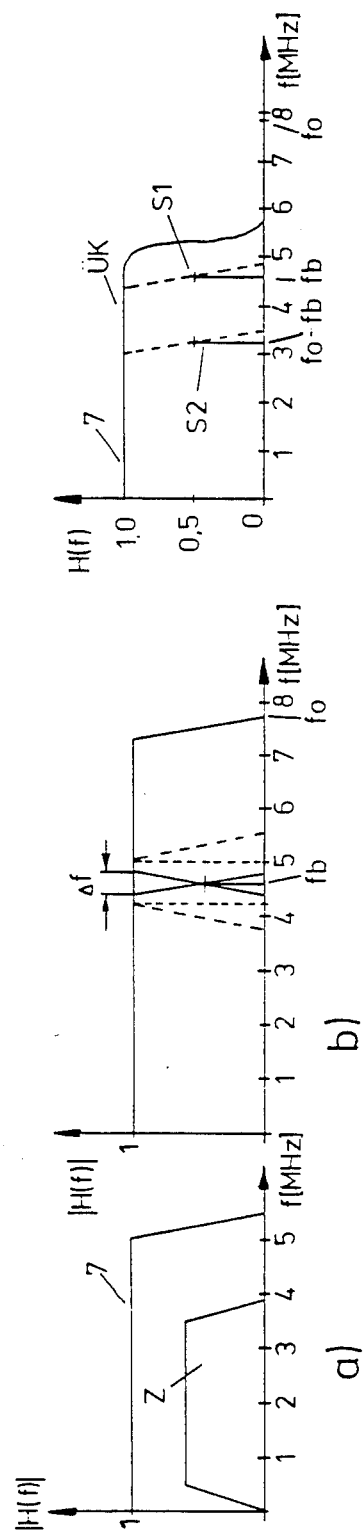

METHOD OF COMPATIBLY INCREASING RESOLUTION IN A COLOR TELEVISION SYSTEM

BACKGROUND OF THE INVENTION

The present invention relates to a method for compatibly increasing resolution in a color television system based on a procedure in which, at the transmitter, part of the signal is converted in frequency by offset modulation and, at the receiver, that signal part is reconverted by offset demodulation, with a reference signal for the offset demodulation being transmitted on an empty line during the vertical blanking interval.

For a compatible increase in detail resolution in color television transmissions, the periodical "Fernseh- und Kinotechnik" [Television and Cinema Technology], Volume 34, No. 2/1980, pages 41-48, describes a method of so-called offset sampling with the use of planar pre- and post-filtering. Similar sampling methods, so-called sub-Nyquist sampling methods, are described in "A single Channel HDTV Broadcast System—the MUSE—", NHK Laboratories Note, Ser. No. 304, September, 1984.

In the above-mentioned procedure, the signal is transmitted via a limited bandwidth channel, with part of the signal, within a partial frequency range, which produces the increase in resolution, not being transmitted in its original spectral position but being changed, by the offset sampling or offset modulation, to a carrier frequency position, i.e. a so-called offset position. For example, a signal component which can no longer be transmitted by means of a conventional television channel of a bandwidth of 5 MHz is converted by the offset modulation to a frequency position within the channel which can then be transmitted, together with the actual baseband video signal of 0 to 5 MHz, over the conventional television channel.

In the prior art method, the sampling modulation frequency, i.e. the frequency of a signal producing the offset modulation, lies outside the bandwidth of the transmission channel. At the playback end, offset demodulation must return the signal, that has been transposed into the offset position, back to its original frequency position so that it can produce the increase in resolution. The reconstruction of this signal component in the original spectral position requires synchronous post-sampling/demodulation at the receiver. The spectral components transmitted at their base position and the spectral components returned to the original position from the carrier frequency position by offset demodulation are combined in the prior art method by means of a Nyquist filter.

In a compatible embodiment for a standard receiver, the additional signal information carried in the channel produces adverse influences which, depending on the manner of distribution of the additional information over two or more fields in the standard line interlace system, express themselves in the form of flicker interference at different frequencies. If the luminance and chrominance information are not transmitted without crosstalk (PAL, NTSC, SECAM) the additional signal information produces further crosstalk problems. To improve compatibility, DE-OS [Federal Republic of Germany Laid-open Application] No. 3,344,524 and counterpart U.S. application Ser. No. 06/680,292 now U.S. Pat. No. 4,723,157, disclose a modulation method (offset modulation) equivalent to offset sampling which employs a reduction in amplitude of the additional signal information at the transmitting end.

A synchronization method which ensures synchronous postsampling or offset demodulation at the receiving end is disclosed in DE-OS No. 3,414,271, and counterpart U.S. Pat. No. 4,661,839]. This synchronization method operates with a phase reference signal which at one-half the sampling/modulation frequency lies at the 6 dB point of the Nyquist filter.

With an application of the modulation method according to DE-OS No. 3,344,524, it is no longer obligatory for communications technology reasons to equip the entire system with a Nyquist channel. Therefore, the spectrum of the total information can be subdivided according to other considerations within the bandwidth of the transmission channel.

To further improve compatibility if the offset modulation method is employed in the PAL system, DE-OS No. 3,435,264, and counterpart U.S. Pat. No. 4,670,773 propose filtering the additional signal information through a lowpass filter. This reduces the region of overlap between the carrier frequency chrominance information and the additional luminance information (increase in resolution) so that the compatible reception is no longer adversely influenced as a result of cross-color interference due to the offset modulation.

Because of the lowpass filtering, the spectral range of the total information is no longer subdivided symmetrically as for Nyquist filtering; rather the frequency band is divided up asymmetrically. Thus the phase sensitive point of the spectral addition can no longer be represented by a reference signal at one-half the modulation frequency.

SUMMARY OF THE INVENTION

It is an object of the present invention to provide a method of the above-described type in which the offset demodulation at the receiver is effected synchronously with the offset modulation at the transmitter while retaining compatibility with existing television standards, such as NTSC, SECAM, PAL, MAC, and under consideration of an asymmetrical frequency band division between the spectral components transmitted in the base position and the spectral components producing increased resolution.

The above and other objects are accomplished, according to the present invention, in a method for compatibly increasing resolution in a color television system, which system includes a transmitter in which part of a television picture signal is converted in frequency by offset modulation with spectral addition of spectral components transmitted in the base band and in which a reference signal for subsequent offset demodulation is produced in coincidence with a blank picture line during vertical blanking intervals, and a receiver which receives the converted signal part, including spectral components, and the reference signal and in which the converted signal part is reconverted by offset demodulation, by the steps of:forming the reference signal at the transmitter such that the reference signal has first and second components with respectively different frequencies; causing the first component to represent phase information about the spectral addition of the spectral components transmitted in the base band and the spectral components reconverted by offset demodulation; and causing the second component to contain information regarding the phase of the offset modulation.

Advantageous additional features of the invention are described below.

According to the invention, phase information, on the one hand, about the spectral addition of the base band video signal (0–5 MHz) at the receiver to the video signal obtained by offset demodulation, and offset modulation phase information, on the other hand, is transmitted by two oscillations at different frequencies. This results in the advantage that the addition of the video signal transmitted in the base band to the video signal obtained by offset demodulation, which produces the increase in resolution, can be effected by any desired edge configuration of a lowpass filter for the former signal and by means of a highpass filter for the latter signal.

In this connection it is assumed that the addition is effected by correspondingly complementary highpass and lowpass splitting, with the frequency fb of the first oscillation lying at the point of intersection of the edges.

Thus a greater degree of freedom results for the frequency position of the overlap region between the two mentioned video signals, i.e. the point of intersection of the characteristics of the lowpass filter for the first video signal and of the highpass filter for the second video signal. In order to avoid interferences, this critical frequency range can therefore be placed, in an advantageous manner, a sufficient distance from the additionally transmitted signals such as, for example, a PAL chrominance subcarrier.

The invention will be described in greater detail below with reference to the drawing figures.

BRIEF DESCRIPTION OF THE DRAWING

FIG. 1 is a block circuit diagram of a system for implementing the method according to the invention.

FIG. 2a is a frequency spectrum diagram showing the position of the additional signal information, i.e. the additional spectrum, filtered through a lowpass filter and reduced in amplitude, in the case of compatible transmission.

FIG. 2b is a diagram similar to FIG. 2a showing the positions after offset demodulation and increasing of the amplitude.

FIG. 3 is a similar diagram showing the spectral position of the two signal components constituting the reference signal.

Figure 4:
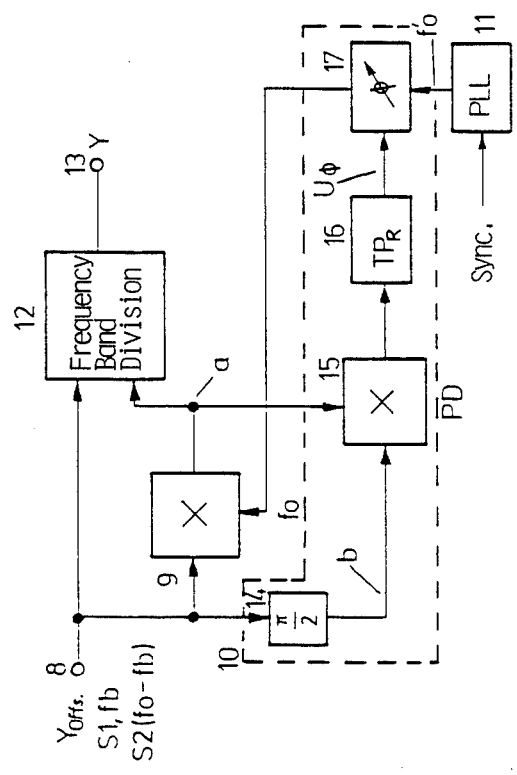
FIG. 4 is a block circuit diagram for phase regulation at the receiver of FIG. 1.

In the description below the following symbols are employed:

fb = the frequency of the first transmitted component S1 of the reference signal;

of = the maximum frequency of the broadband video signal Y available at the transmitter and receiver after offset demodulation;

fo − fb = the frequency of the second transmitted component S2 of the reference signal.

DESCRIPTION OF THE PREFERRED EMBODIMENTS

In the system of FIG. 1, a luminance signal Y containing spectral components for increased resolution and having, for example, an increased bandwidth of 7–8 MHz is fed to input terminal 1. By means of an insertion circuit 2, described in greater detail in DE-OS No. 3,414,271 and U.S. Pat. No. 4,661,839, a reference signal component S1 at frequency fb is inserted in a free picture line, e.g. lines 15 and 328, during the vertical blanking interval of each field for the duration of that line. An offset modulator 3, described in greater detail in DE-OS No. 3,344,524 and allowed U.S. application Ser. No. 06/680,292 operating at the offset modulation frequency fo converts component S1 at frequency fb to component S2 at frequency fo−fb. In an adder stage 4, components S1, S2 at frequencies fb and fo−fb, respectively, are combined and are available for transmission at transmitter output terminal 6. Transmission takes place in transmission channel 7 so that components S1, S2 at frequencies fb and fo−fb are available for processing at receiver input terminal 8.

The sum of components S1, S2 at frequencies fb and fo−fb is fed to offset demodulator 9 which is constructed analogously to offset modulator 3 in the transmitter. In the unregulated state, offset demodulator 9 operates with a demodulation signal S3 at frequency f'o which is produced with the aid of sync signals, such as line synchronizing pulses, in a PLL circuit in frequency recovery circuit 11. Oscillation S3 at frequency f'o initially has an arbitrary phase position. The components resulting after offset demodulation of components S1, S2 at frequencies fb and fo−fb at the output of offset demodulator 9 are compared in a phase regulating circuit 10 with respect to the phase positions of the components at frequencies fb and fo−fb furnished at terminal 8. This results in a regulation such that the initially arbitrary phase position of S3 is regulated to a demodulating signal S4 having the desired phase position and frequency of fo. Thus there is phase synchronism between the offset modulation at the transmitter and the offset demodulation at the receiver.

The base video signal of about 0–5 MHz furnished through channel 7 and the video signals of about 5–8 MHz produced by offset demodulation in demodulator 9 are fed to circuit 12 to undergo asymmetrical frequency band division. Such a circuit is disclosed in greater detail in DE-OS No. 3,435,264 and U.S. Pat. No. 4,670,773. The luminance signal Y is then available at receiver output terminal 13 with an increased bandwidth of about 8 MHz for playback of a picture with increased resolution.

FIG. 2a shows the lowpass filtered and reduced amplitude additional signal information, i.e. the additional spectrum Z produced by offset modulation to increase detail resolution, with respect to its frequency position in transmission channel 7.

FIG. 2b shows the entire spectrum of luminance signal Y as it is available at receiver output terminal 13 after offset demodulation with amplitude raising in stage 9 and frequency band division in stage 12. It can be seen that this spectrum has a bandwidth of about 8 MHz which is greater than the 5 MHz bandwidth of transmission channel 7. The addition of the spectral components transmitted in the base band and the spectral components of the additional spectrum offset by offset demodulation with demodulating signal S4 at frequency and phase fo is effected with the creation of an edge, or transition, region Δf, with the most phase sensitive point being represented by component S1 at frequency fb.

FIG. 3 shows the spectral positions of components S1, S2 of the reference signal as produced at the transmitter by the system of FIG. 1, relative to transmission channel 7. In the PAL television standard (PAL (G))

the stated frequencies fo, fb may have the following values:

fo = 7.8 MHz
fb = 4.7 MHz
fo − fb = 3.1 MHz

Here, fo corresponds to approximately the highest frequency of the spectrum according to FIG. 2b produced on the playback side.

FIG. 4 is a block circuit diagram of one suitable embodiment of phase regulation circuit 10 of FIG. 1 at the receiver. Transmission channel 7 furnishes component S1 at frequency fb and component S2 at frequency (fo − fb) influenced by modulation phase is at the transmitter. Thus the following signals are available at the receiver for regulation purposes:

$$\cos[2\pi fb \cdot t] + \cos[2n(fo-fb) \cdot t + \phi s] \quad (1)$$

Offset demodulator 9 at the receiver initially operates in the unregulated state at frequency f'o which is affected by an arbitrary phase $\phi e$. Frequency f'o is generated from the line sync pulse by means of frequency recovery circuit (PLL) 11. The following phase related equation here applies:

$$f'o \cdot t = fo \cdot t + \phi e \quad (2)$$

The modulation of the components according to Equation (1) with f'o according to Equation (2) is described as follows:

$$\{\cos[2n fb \cdot t] + \cos[2\pi(fo-fb) \cdot t + \phi s]\} \cdot 2 \cos[2\pi f'o \cdot t + \phi e] \quad (3)$$

After offset demodulation, the following applies for point a in FIG. 4:

$$\cos[2\pi(fb+fo) \cdot t + \phi e] + \cos[2\pi(fo-fb) \cdot t + \phi e] + \cos[2\pi(2fo-fb) \cdot t + \phi s + \phi e] + \cos[2\pi fb \cdot t + \phi e - \phi s] \quad (4)$$

Since the stable operating point of the regulation lies at phase different $\Delta = 0$, the input signals according to Equation 1 are fed to a 90° phase shifter 14. A phase detector (PD) 15 in the form of a multiplier receives the signals according to Equation 4 and at point b the input signals shifted in phase by 90°.

Point b:

$$\cos[2\pi fb \cdot t + \pi/2] + \cos[2\pi(fo-fb) \cdot t + \phi s + \pi/2] = -\{\sin[2\pi fb \cdot t] + \sin[2\pi(fo-fb) \cdot t + \phi s])\} \quad (5)$$

Multiplication of the terms of Equations 4 and 5, after filtering in lowpass filter TPR 16 of the control loop, furnishes a direct control voltage for phase shifter 17. This multiplication and filtering brings control voltage U$\phi$ to $$U\phi = \sin(\phi e - \phi s) \quad (6)$$

The regulation is now effected in such a way that the argument of the sine function becomes zero, i.e.

$$\phi e = \phi s$$

Phase shifter 17 has an operating range of ±180°.

Figure 5:
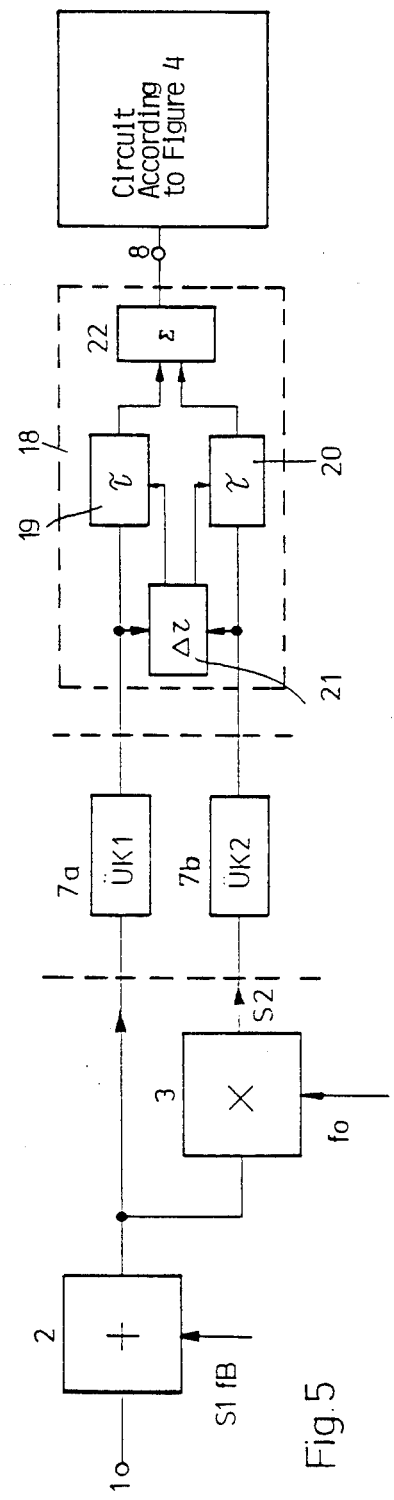
FIG. 5 is a block circuit diagram of a modified system for implementing the invention employing two transmission channels.

In FIG. 5, the signals described in connection with FIG. 1 from the outputs of insertion circuit 2 and offset modulator 3 are not added together but instead are transmitted over separate transmission channels 7a and 7b. This may be appropriate if, for example, one transmission channel is not sufficient for reasons of bandwidth, if bandwidth limited cable lengths are involved, or if the two signals are recorded on separate tracks of a magnetic tape.

With such a transmission over separate transmission channels, different delays may occur so that the signals at the receiver no longer coincide in time. To compensate for this time deviation, the signals of the two transmission channels 7a, 7b are conducted through two controllable delay members 19, 20 and are also applied to the inputs of a delay comparison stage 21. Comparison stage 21 determines the time position of the signals of the two channels 7a, 7b with respect to one another. Preferably, a start/stop oscillator is controlled with the line, or horizontal, sync pulses of the signals of the two channels 7a, 7b so as to produce a pulse train of constant frequency between two line sync pulses which should occur simultaneously. The number of pulses is counted by a counter. The counting result is a measure for the time deviation between the line sync pulses of the signals of the two channels 7a, 7b. The counting result is converted to an analog or digital control voltage which, depending on the direction of the time delay, controls delay member 19 or 20, and thus the delay effective on the signal path, so that the signals at the inputs of adder stage 22 occur simultaneously in time. Delay comparison stage 21 compares the vertical sync pulses as well as the line sync pulses of the signals of both channels 7a and 7b in the described manner.

The regulation by means of delay members 19, 20 is effected in such a manner that the signals of the two channels 7a, 7b are coincident in time at the inputs of adder stage 22, i.e. vertical sync pulses and lines of the same ordinal of each frame are coincident in time in both channels 7a, 7b. This regulation is made with such an accuracy that at most a deviation of ±one-half a period duration of frequency fo remains. This accuracy is required by the receiver circuit of FIG. 4 connected at terminal 8. Delay members 19, 20 have a basic, or normal, delay such that the regulating voltage coming from comparison stage 21 can increase or decrease the delay effective on the corresponding signal path. Such so-called time error compensating circuits are known in the magnetic recording art and are disclosed, for example, in the "Videohandbuch" [Video Handbook] by Wetzel.

The above-described arrangements are illustrated for the example of offset modulation/demodulation for analog signal processing. It is also possible, in principle, to construct all components for digital signal processing. In that case, the modulators/demodulators must be replaced by corresponding digital samplers/post-samplers.

The method according to the invention is suitable for the transmission of television signals as well as for synchronization during playback of, for example, television signals recorded by means of video recorders.

A suitable embodiment of frequency recovery circuit 11 is a "Phase locked loop" circuit (PLL). A variety of PLL's are disclosed in the book "phaselock Techniques" by Floyd M. Gardner, 2nd edition, John Wiley & Sons, 1979. The IC-circuit MC1 4046 available on the market may fulfil the object of said frequency recovering circuit 11.

The signal Y at terminal 1 having a bandwidth of 7–8 MHz may be produced by a camera or a flying spot scanner widely used at the studio level. In the case of black and white equipment the output of such devices may be the Y-signal. In the case of colour equipment the R, G, B signals will be matrixed to obtain the signals Y, R—Y, B—Y. An appropriate arrangement is more fully described in DE-OS No. 3 344 524.

The invention now being fully described, it will be apparent to one of ordinary skill in the art that many changes and modifications can be made thereto without departing from the spirit or scope of the invention as set forth herein.

The present disclosure relates to the subject matter disclosed in German Application No. P 36 40 848.4 of Nov. 29th, 1986, the entire specification of which is incorporated herein by reference.

What is claimed is:

1. In a method for compatibly increasing resolution in a color television system, which system includes a transmitter in which part of a television picture signal is converted in frequency by offset modulation with spectral addition of spectral components transmitted in the base band and in which a reference signal for subsequent offset demodulation is produced in coincidence with a blank picture line during vertical blanking intervals, and a receiver which receives the converted signal part, including spectral components, and the reference signal and in which the converted signal part is reconverted by offset demodulation, the improvement comprising: forming the reference signal at the transmitter such that the reference signal has first and second components with respectively different frequencies; causing the first component to represent phase information about the spectral addition of the spectral components transmitted in the base band and the spectral components reconverted by offset demodulation; and causing the second component to contain information regarding the phase of the offset modulation.

2. Method as defined in claim 1 further comprising transmitting the first and second components simultaneously.

3. Method as defined in claim 1 wherein the television picture signal has a portion providing increased picture resolution, and the frequency of the first component is greater than one-half the highest frequency of the signal portion providing increased resolution and less than the highest frequency transmittable through the transmission channel.

4. Method as defined in claim 3 wherein the frequency of the second component is equal to the difference between the highest frequency of the signal portion providing increased resolution and the frequency of the first component.

5. Method as defined in claim 1 wherein the receiver includes an offset demodulator having a modulated signal input, a demodulating signal input and a demodulated signal output, a phase regulating circuit having first and second control inputs, a phase signal input and a regulating signal output, and a frequency recovery circuit having a sync signal input and a phase signal output, and wherein said method further comprises, at the receiver, supplying the reference signal to the modulated signal input of the offset demodulator and to the first control input of the phase regulating circuit, supplying the signal at the demodulated signal output of the offset demodulator to the second control input of the phase regulating circuit, supplying horizontal sync pulses associated with the television picture signal to the sync signal input of the frequency recovery circuit and forming in the frequency recovery circuit a signal which is representative of the horizontal sync pulses and which appears at the phase signal output of the frequency recovery circuit, applying the signal which appears at the phase signal output to the phase signal input of the phase regulating circuit and forming in the phase regulating circuit a regulating signal which appears at the regulating signal output, applying the signal at the regulating signal output to the demodulating signal input of the offset demodulator and causing the offset demodulator to produce a demodulated signal which appears at the demodulated signal output.

6. Method as defined in claim 5 wherein the signal at the phase signal output of the frequency recovery circuit has a frequency equal to a whole number multiple of the line scanning frequency of the television picture signal.

7. Method as defined in claim 1 further comprising transmitting the first and second components of the reference signal from the transmitter to the receiver over respective ones of two different transmission channels.

8. Method as defined in claim 7 further comprising, at the receiver, feeding the components from the two transmission channels to a delay comparison stage which produces an output signal representative of the difference in delay between the two transmission channels, and acting on a delay member disposed in one of the transmission channels in such a manner as to substantially restore the phase relation which existed between the components at the transmitter.

9. Method as defined in claim 8 wherein the television picture signal has a portion providing increased picture resolution and having a frequency range which, before frequency conversion in the transmitter, extends to an upper value greater than the upper limit of the bandwidth of the transmission channels, and said step of acting on a delay member is carried out in such a manner as to restore the phase relation between the components at the receiver to within no more than one-half the period duration of the upper value of the frequency range of the picture signal portion providing increased picture resolution.

10. Method defined in claim 9 wherein vertical sync pulses are transmitted from the transmitter to the receiver, there are two delay members each disposed in a respective one of the two transmission channels, and said step of acting comprises effecting a comparison between the time position of the vertical sync pulses and the horizontal sync pulses of the signals from the two transmission channels at the outputs of both delay members for causing picture lines of the same ordinal from the two transmission channels to coincide in time.

11. Method defined in claim 8 wherein vertical sync pulses are transmitted from the transmitter to the receiver, there are two delay members each disposed in a respective one of the two transmission channels, and said step of acting comprises effecting a comparison between the time position of the vertical sync pulses and the horizontal sync pulses of the signals from the two transmission channels at the outputs of both delay members for causing picture lines of the same ordinal from the two transmission channels to coincide in time.

* * * * *